Figure 1:
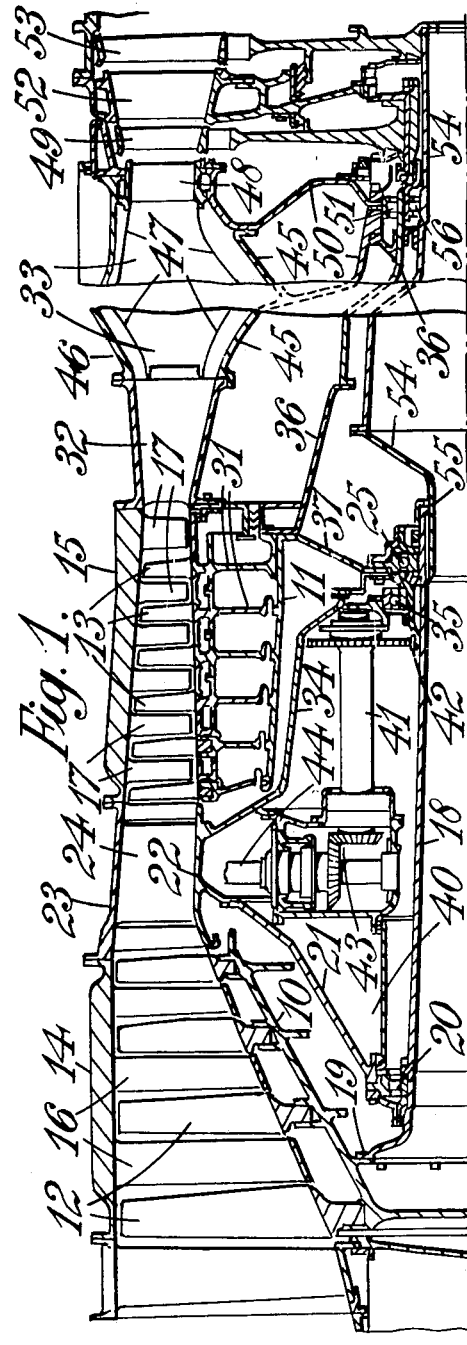

United States Patent Office 2,756,561
Patented July 31, 1956

2,756,561

GAS TURBINE ENGINE WITH AXIAL-FLOW COMPRESSOR AND BEARING MEANS FOR SUPPORTING THE COMPRESSOR ROTOR

Frederick William Walton Morley, Castle Donington, England, assignor to Rolls-Royce Limited, Derby, England, a British company Application January 16, 1953, Serial No. 331,641

Claims priority, application Great Britain January 18, 1952

22 Claims. (Cl. 60—39.16)

This invention relates to gas turbine engines of the kind including a multi-stage axial flow compressor delivering air to delivery ducting; which compressor has a rotor drum. The delivery ducting usually leads, directly or indirectly, to combustion equipment from which the products of combustion pass to a turbine coaxial with said compressor and driving it through a driving shaft interconnection.

The invention seeks to provide an improved arrangement for the bearing support of the compressor shaft in such a gas turbine engine.

According to the present invention, a gas turbine engine of the kind described comprises a shaft supporting the rotor drum of the compressor, which shaft is borne in a plurality of axially-spaced bearings, and stationary bearing support structure for the bearing of the compressor shaft nearest the inlet of the compressor, which stationary bearing support structure is in turn supported from the stationary outer casing of the compressor only through members extending across the delivery ducting of the compressor.

In this way, the members which normally extend across the inlet of the compressor to transfer loads from the bearing nearest the inlet to the compressor casing may be dispensed with.

Preferably the bearing for the compressor shaft nearest the inlet of the compressor is located in a plane between the inlet and delivery rotor blading stages of the compressor, so that the rotor drum of the compressor surrounds, in part at least, said stationary bearing support structure.

According to a feature of the invention, the stationary bearing support structure may transmit the bearing loads of the compressor shaft from a number of bearings spaced axially along the shaft. Thus, if there is a rigid shaft connection between the rotor of the turbine and the rotor-drum of the compressor, the stationary bearing support structure may support a bearing adjacent the turbine as well as that nearest the inlet of the compressor.

According to another feature of the invention, a gas turbine engine of the kind described may be provided with separate compressor and turbine shafts, a further bearing support structure for at least the bearing of the turbine shaft nearest the turbine, which further bearing support structure is separate from the stationary bearing support structure for the bearing of the compressor shaft nearest the inlet of the compressor, and a drive coupling interconnecting the turbine and compressor shafts, which drive coupling is of the kind which permits slight malalignment between the shafts which it interconnects.

The invention can, with advantage, be applied to gas turbine engines of the kind described which comprise coaxially arranged low- and high-pressure compressors, of which the low-pressure compressor delivers through its delivery ducting, in part at least, to the high-pressure compressor; which compressors are driven respectively by coaxial low- and high-pressure turbines through independent coaxial driving shafts. Such compound gas turbine engines are hereinafter referred to as "compound gas turbine engines of the type described."

According to a further feature of the invention, in a compound gas turbine engine of the type described, the stationary bearing support structure may support a bearing of the shaft supporting the low-pressure compressor rotor-drum and the delivery ducting across which the members extend may be the delivery ducting of the low pressure compressor.

In such constructions of compound gas turbine engines of the type described, the loads from a bearing for the compressor shaft of the high-pressure compressor may also be transmitted, at least in part, by the stationary bearing support structure.

Thus, for instance, a bearing for the hollow compressor shaft of a high-pressure compressor may be supported by the stationary bearing support structure, and the end of the low-pressure compressor shaft remote from the inlet end of the low-pressure compressor may be borne by a bearing mounted in the hollow high-pressure shaft adjacent the bearing thereof which is supported by the stationary bearing support structure. In this arrangement the stationary bearing support structure, since it supports the bearing of the high-pressure compressor shaft, will transmit the whole load of that bearing; and that load will include part at least of the load of the bearing of the low-pressure compressor shaft mounted in the hollow high-pressure compressor shaft. The stationary bearing support structure therefore transmits part at least of the load of the bearing of the low-pressure compressor shaft.

According to a further feature of the invention a compound gas turbine engine of the type described may comprise a low-pressure compressor of the axial-flow kind, of which the compressor rotor includes a drum-like structure supporting rotor blading and surrounding and supported by a low-pressure compressor shaft, there being provided a stationary bearing support structure located between said drum-like structure and said shaft and connected to be supported only by members extending across ducting leading from the low-pressure compressor to the high-pressure compressor, said members being supported by outer stationary compressor structure, and said stationary bearing support structure supporting the bearing for the low-pressure compressor shaft nearest the inlet of the low-pressure compressor.

According to a further feature of the invention a compound gas turbine engine of the type described may comprise high- and low-pressure compressors which are of the axial-flow kind, and the rotor drum of the low-pressure compressor may be supported through axially-spaced bearings, one of which lies in a plane normal to the axis of the engine located between the inlet and delivery stages of the low-pressure compressor, whilst the second bearing is located in a transverse plane in the region of the inlet and of the high pressure compressor, a stationary bearing support structure having a part which is surrounded by the rotor-drum of the low pressure compressor and supports the bearing of the low pressure compressor shaft nearest the inlet of the low pressure compressor, and having another part surrounded by the rotor of the high pressure compressor which other part supports the other bearing of the low pressure compressor shaft, and members extending through delivery ducting between the low pressure compressor and the high pressure compressor which members are carried by outer stationary compressor structure and are connected to the stationary bearing support structure to constitute the only means by which bearing loads are transmitted from said stationary bearing support structure to the outer stationary compressor structure. Preferably in such an arrangement the low pressure compressor shaft is borne by the high pressure compressor shaft by bearing means interposed therebetween.

According to yet a further feature of the invention, in a compound gas turbine engine of the type described, the stationary bearing-support structure may be arranged to provide an annular space surrounding the low pressure compressor shaft and accommodating auxiliary drive mechanism driven by one of the compressor shafts, preferably the high pressure compressor shaft. Such auxiliary drive mechanism will normally include a reduction gear and a drive shaft extending across the ducting between the low-pressure compressor and the high-pressure compressor.

In accordance with a further feature of the invention, there may be provided a compound gas turbine engine of the type described including a low-pressure compressor rotor shaft which is borne in a pair of axially-spaced bearings and which supports a rotor drum of the low-pressure compressor, wherein the one of said bearings nearest the inlet of the low-pressure compressor is supported in a stationary bearing support structure which in turn is supported from the stationary outer casing of the compressor only through members extending across the ducting between the two compressors and the other of said bearings is mounted in the shaft of the high-pressure compressor, and wherein the low-pressure compressor rotor shaft is driven by a low pressure turbine having a shaft connected to said low pressure compressor shaft through a drive connection providing for slight malalignment, and wherein said low-pressure turbine shaft is borne within the shaft of the high-pressure turbine by bearing means adjacent the turbines, and wherein the said high-pressure turbine shaft is borne in stationary structure supported by members extending across ducting conveying combustion products to the turbine systems, and wherein the high-pressure turbine compressor rotor assembly is additionally borne by bearing means in the stationary bearing support structure.

Embodiments of the invention will now be described with reference to the accompanying drawings of which—

Figure 2:
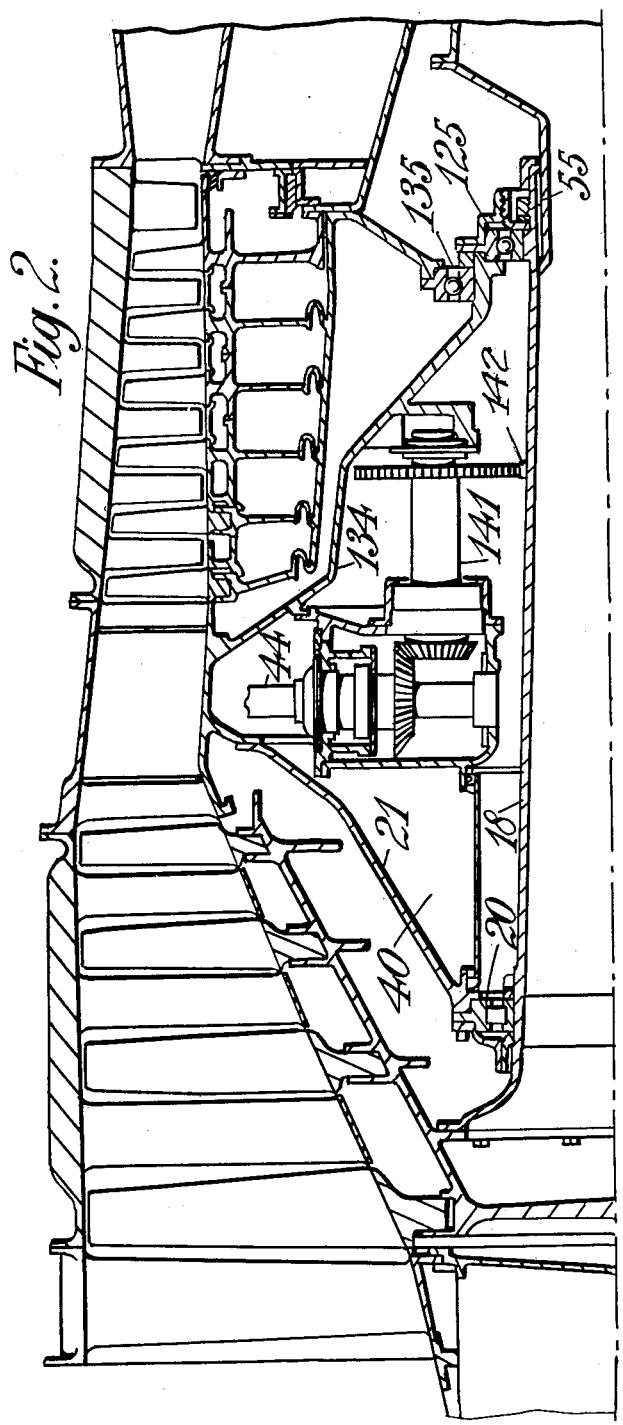
Figure 3:
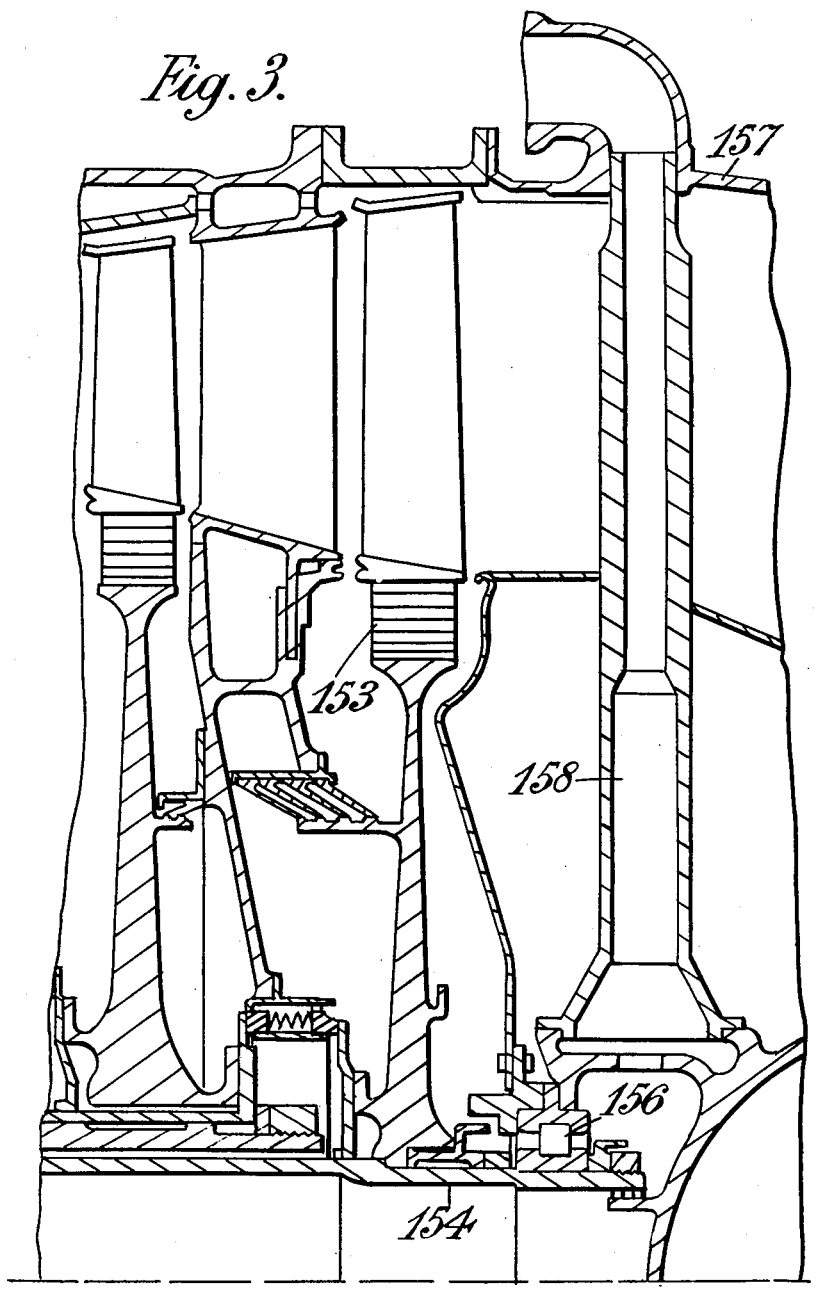
Figure 4:
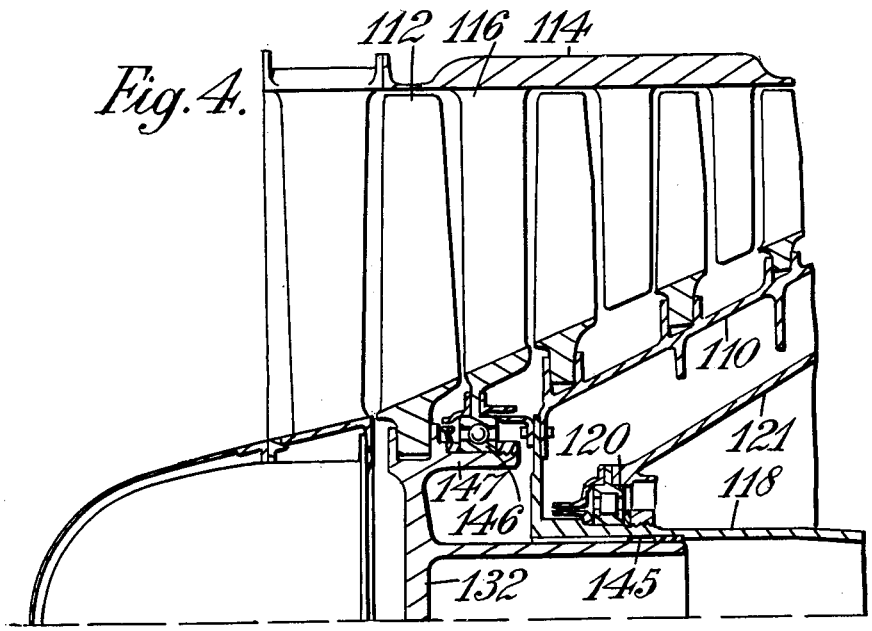
Figure 5:
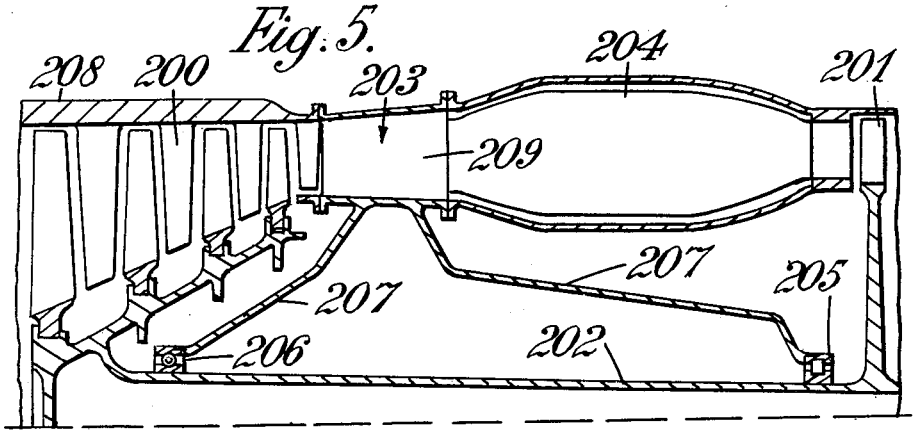

Figure 1 is a longitudinal section of a compound gas turbine engine of the type described, Figure 2 is a section of another compound gas turbine engine of the type described, Figure 3 is a section on a larger scale of the turbines in another compound gas turbine engine of the type described, Figure 4 is a section of the inlet stages of a compressor employed in a gas turbine engine embodying the invention, and Figure 5 is a section of a gas turbine engine embodying the invention.

In all the figures, the section is taken only above the axis of rotation.

Referring to Figure 1, there is shown a compound gas turbine engine of the type described which is suitable for aircraft reaction propulsion. In this engine both the high-pressure and low-pressure compressors are of the axial-flow kind. These compressors comprise respectively rotor drum structures 10, 11 supporting rotor blading 12, 13 which is enclosed by outer stationary compressor structure 14, 15 the latter supporting stator blading 16, 17 extending radially inwards and intercalated with the rotor blading.

The rotor drum 10 of the low-pressure compressor is of generally frusto-conical form, increasing in diameter from the inlet end to the delivery end, whilst the outer stationary compressor casing structure 14 of the low-pressure compressor is substantially cylindrical. This provides a compressor duct whose cross-section decreases appropriately from the inlet end to the delivery end according to the compression ratio of the compressor. The low-pressure compressor rotor drum 10 is supported on a hollow compressor shaft 18 which extends within the hollow of the drum 10 and is bolted to the drum at a flange connection 19 which lies in a plane normal to the axis of rotation and is located in the plane of the first stage stator blading.

The low-pressure compressor shaft 18 is borne by a suitable journal bearing 20, e. g. a roller bearing, which lies in a plane normal to the axis of rotation and passing through the second stage blading. The bearing 20 is supported in stationary bearing-support structure comprising a casing 21 which is generally of frusto-conical form and lies within the low-pressure compressor rotor drum 10 and surrounds the shaft 18. This casing 21 extends to and is supported by the inner wall 22 of annular delivery ducting of the low-pressure compressor, through which air passes from the low-pressure compressor to the high-pressure compressor. The outer wall 23 of this annular ducting forms a continuation of the outer stationary compressor casing structures 14, 15, and interconnects these structures, and a number of radially-disposed webs 24 interconnect the inner and outer walls 22, 23 of the annular ducting. Conveniently the ducting may be cast. The webs 24 provide members through which loads are transferred from the stationary bearing-support structure to the outer wall 23 of the annular ducting and thence to the outer stationary compressor casing structures 14, 15.

The low-pressure compressor shaft 18 extends away from the inlet end of its compressor and is surrounded by the high-pressure compressor rotor 11 and stator 15, which are described in greater detail below. An additional bearing 25 supports the low-pressure compressor shaft 18, and this bearing is carried in the structure of the high-pressure compressor rotor. The additional bearing is preferably of the ball-thrust kind as shown, for locating the compressor shaft axially with respect to the stationary bearing-support structure.

The high-pressure compressor comprises a rotor drum structure 11 which supports a member of thin discs 31 which may be in splined engagement with the structure, each disc 31 carrying a stage of rotor blading 13. The first stage of rotor blading receives air from the annular delivery ducting of the low-pressure compressor, and the high-pressure compressor delivers to annular diffuser ducting 32 leading to annular combustion equipment 33 of the engine.

The stationary bearing support structure above referred to also comprises a sleeve-like member 34 which is supported by the inner wall 22 of the delivery ducting of the low-pressure compressor and extends from the inner wall 22 into the drum 11 of the high-pressure compressor and supports the outer race of a ball-bearing 35 for the high-pressure rotor shaft 36, which forms substantially a continuation of the drum structure 11. The inner race of this ball-bearing 35 is connected to the high-pressure shaft 36 by an annular flange member 37 which extends inward from the delivery end of the rotor drum 11 to be received within the inner race of the ball bearing 35. In this way the rotor drum 11 and shaft 36 may be made of considerably larger diameter than the low-pressure compressor shaft 18.

The stationary bearing-support structure 21, 34 surrounds the low-pressure compressor shaft 18, and encloses an annular hollow space 40 between the low-pressure compressor shaft 18 and the stationary bearing-support structure 21, 34 which accommodates auxiliary drive mechanism 41 driven from a high-speed pinion 42 carried on an extension of the annular flange member 37. Additionally the auxiliary drive mechanism includes a bevel drive 43 for driving an auxiliary drive shaft 44 which extends radially outwards across the annular ducting. The shaft 44 is thus driven from the high-pressure shaft 36.

As previously mentioned, the high-pressure compressor delivers to annular combustion equipment 33 which includes inner and outer air casing walls 45, 46 accommodating an annular flame tube 47. The products of combustion pass to the high-pressure nozzle-guide-vane assembly 48, and thence to the high-pressure turbine 49, which is of the axial flow type. The high-pressure turbine 49 is supported on the hollow shaft 36 which extends between the turbine 49 and the high-pressure compressor rotor 11 within the inner air casing wall 45 of the combustion equipment. The inner air casing wall 45 carries stationary structure 50 to support a bearing 51 adjacent the turbine for the high-pressure turbine rotor assembly.

Interstage nozzle guide vanes 52 are provided between the high-pressure turbine 49 and the low-pressure turbine 53, the latter being carried on a shaft assembly including a hollow drive shaft 54 extending between the low-pressure turbine 53 and the near end of the low-pressure compressor shaft 18, where a splined interconnection 55 provides for a degree of malalignment in the drive. A bearing 56 is provided between the low-pressure turbine shaft 54 and the high-pressure rotor shaft 36, approximately in the transverse plane of the bearing 51 supporting the high-pressure shaft in the stationary structure 50.

The construction illustrated in Figure 2 is the same as that shown in Figure 1 except that the bearing for the low-pressure compressor shaft remote from the inlet of the compressor and the bearing for the high-pressure compressor shaft nearer the inlet to the compressor are differently supported from the stationary bearing support structure and also the location of the auxiliary drive is slightly altered. In this construction, the part 134 of the stationary bearing support structure extends between the bearing 125 for the low-pressure compressor shaft and the bearing 135 for the high-pressure compressor shaft and is directly connected to the stationary races of both these bearings. In this way, the whole bearing load of both these bearings 125 and 135 is transmitted directly to the part 134 of the stationary bearing structure. As will be seen, the bearing 135 is located outside the part 134.

In this embodiment, the auxiliary drive mechanism is driven from a pinion 142 on the shaft 18, and is thus driven by the low-pressure rotor assembly. The auxiliary drive mechanism may of course be driven from either the high-pressure rotor shaft or the low-pressure rotor shaft, as desired, with any of the bearing arrangements described, and a suitable arrangement for, say, driving the auxiliary mechanism from the high-pressure rotor with the bearing arrangement of Figure 2 may be simply effected by one skilled in the art combining the features of Figure 1 and Figure 2. In this case, the shaft 141 will pass through the part 134.

Figure 3 illustrates an alternative arrangement for the bearing of the low-pressure turbine shaft. Instead of being supported by a bearing, such as the bearing 56 of Figure 1, sandwiched between the shafts of the high and low-pressure turbines, the low-pressure turbine shaft 154 is carried by a roller bearing 156 which is located downstream of the low pressure turbine 153 and is supported from the outer casing 157 of the turbine by a number of arms 158. The casing 157 is connected, as will be seen, with the outer stationary compressor structure 14, 15 through structural parts of the engine. A supply of air may be fed through arms 158 to bearing 156 for cooling purposes.

Figure 4 illustrates the intake end of the low pressure compressor in another embodiment according to the invention. The remaining portion of the engine which is not illustrated in Figure 4 is the same as the corresponding portion of the engine illustrated in either Figure 1 or Figure 2. As shown in Figure 4, the shaft 118 supports the rotor drum 110 of the rotor of the low-pressure compressor and is itself supported by a roller bearing 120 which is carried by the casing 121 of the stationary bearing support structure. The compressor rotor also has a subsidiary portion 132 which carries the first stage row of rotor blades 112, i. e. those at the inlet of the compressor. This subsidiary portion 132 is drivingly connected to the shaft 118 by the splined connection 145, and is carried by the ball thrust bearing 146 of which the outer stationary race is connected to the outer casing 114 of the compressor solely by the row of stator blades 116 of the first stage of the compressor, i. e. the row immediately downstream of the row of rotor blades 112. The inner rotating race of the bearing 146 is secured to and carried by the skirt 147 which extends axially at the periphery of the portion 132.

Figure 5 shows another embodiment of the invention in which there is one compressor 200 and one turbine 201, coaxial with one another and rigidly connected together by a shaft 202. The compressor 200 discharges to an annular delivery duct 203 which leads to the combustion equipment 204.

The shaft 202 is carried by a roller bearing 205 adjacent the turbine 201 and a ball bearing 206 adjacent the inlet end of the compressor 200. The outer stationary races of both these bearings are supported by a stationary bearing support structure 207 which in turn is supported from the outer casing 208 of the compressor 200 through members 209 which extend across the delivery duct 203 of the compressor 200.

I claim:

1. A gas turbine engine comprising a multi-stage axial-flow compressor having an inlet and an outlet and including a rotor drum, a plurality of rows of rotor blades carried by said drum, one for each stage, outer stationary compressor casing structure, and a plurality of rows of stator blades carried by said outer casing and alternating with said rows of rotor blades, means forming delivery ducting for said compressor including an inner duct wall, an outer duct wall connected to said outer stationary compressor casing structure, and members extending across said ducting, a rotor shaft drivingly connected to said rotor drum and supporting said drum, a plurality of bearings spaced axially of the shaft to carry said shaft, and stationary bearing support structure carrying the one of said bearings nearest the inlet of the compressor and connected to the members extending across the delivery ducting to be supported from the outer compressor casing structure only through said members.

2. A gas turbine engine as claimed in claim 1, wherein the one of said bearings nearest the inlet of the compressor is located between the plane of the row of rotor blades nearest the inlet of the compressor and the plane of the row of rotor blades nearest the outlet of the compressor, whereby said rotor drum encircles said bearing.

3. A gas turbine engine as claimed in claim 1 wherein said stationary bearing support structure carries more than one of said plurality of bearings.

4. A gas turbine engine comprising a low-pressure compressor and a high-pressure compressor in flow series, said low-pressure compressor being a multi-stage axial-flow compressor having an inlet and an outlet and including a rotor drum and outer stationary low-pressure compressor casing structure, said high-pressure compressor being a multi-stage axial-flow compressor having an inlet and an outlet and including a rotor drum, and said engine comprising means forming delivery ducting for said low-pressure compressor including an inner duct wall, an outer duct wall connected to said outer stationary low-pressure compressor casing structure, and members extending across said ducting, a low-pressure rotor shaft drivingly connected to the rotor drum of said low-pressure compressor and supporting said drum, a plurality of low-pressure rotor shaft bearings spaced axially of said low-pressure rotor shaft to carry said low-pressure shaft, a high-pressure rotor shaft drivingly connected to the rotor drum of said high-pressure compressor, a plurality of high-pressure rotor shaft bearings spaced axially of said high-pressure rotor shaft to carry said high-pressure shaft, and stationary bearing support structure carrying the one of said low-pressure rotor shaft bearings nearest the inlet of the low-pressure compressor and the one of said high-pressure rotor shaft bearings nearest the inlet of the high-pressure compressor and connected to the members extending across the delivery ducting of the low-pressure compressor to be supported from the outer compressor casing structure only through said members.

5. A gas turbine engine as claimed in claim 4 wherein a further one of said low-pressure rotor shaft bearings is carried directly by said stationary bearing support structure.

6. A gas turbine engine as claimed in claim 4 wherein a further one of said low-pressure rotor shaft bearings is carried within said high-pressure rotor shaft adjacent said high-pressure rotor shaft bearing carried by said stationary bearing support structure.

7. A gas turbine engine comprising a multi-stage axial-flow compressor having an inlet, an outlet, a tubular stator structure extending between said inlet and said outlet, a plurality of rows of stator blades mounted in said stator structure, a rotor drum mounted within said stator structure, a plurality of rows of rotor blades carried by said rotor drum and extending between said rows of stator blades, delivery ducting connected to said outlet of said compressor and comprising an outer annular wall connected to said stator structure and an inner annular wall within said outer annular wall, a compressor shaft supporting said rotor drum, a plurality of axially-spaced bearings bearing said compressor shaft including a forward bearing for the end of said compressor shaft nearest said inlet, a stationary bearing support structure supporting said forward bearing and support members connected to said outer annular wall, extending across said delivery ducting and connected to said stationary bearing support structure to constitute the sole support for said bearing support structure.

8. A gas turbine engine comprising a multi-stage axial-flow compressor having an inlet, an outlet, a tubular stator structure extending between said inlet and said outlet, a plurality of rows of stator blades mounted in said stator structure, a rotor drum mounted within said stator structure, a plurality of rows of rotor blades carried by said rotor drum and extending between said rows of stator blades, delivery ducting connected to said outlet of said compressor and comprising an outer annular wall connected to said stator structure and an inner annular wall within said outer annular wall, a compressor shaft supporting said rotor drum, a plurality of axially-spaced bearings bearing said compressor shaft including a forward bearing for the end of said compressor shaft nearest said inlet, said forward bearing being located between said inlet and said outlet, a stationary bearing support structure supporting said forward bearing extending from said outlet towards said inlet and surrounded in part at least by said rotor drum, and support members connected to said outer annular wall, extending across said delivery ducting and connected to said stationary bearing support structure to constitute the sole support for said bearing support structure.

9. A gas turbine engine comprising a multi-stage axial-flow compressor having an inlet, an outlet, a tubular stator structure extending between said inlet and said outlet, a plurality of rows of stator blades mounted in said stator structure, a rotor drum mounted within said stator structure, a plurality of rows of rotor blades carried by said rotor drum and extending between said rows of stator blades, delivery ducting connected to said outlet of said compressor and comprising an outer annular wall connected to said stator structure and an inner annular wall within said outer annular wall, a compressor shaft supporting said rotor drum, a plurality of axially-spaced bearings bearing said compressor shaft including a forward bearing for the end of said compressor shaft nearest said inlet and a further bearing, a stationary bearing support structure supporting said forward bearing and said further bearing, and support members connected to said outer annular wall, extending across said delivery ducting and connected to said stationary bearing support structure to constitute the sole support of said bearing support structure.

10. A gas turbine engine comprising a multi-stage axial-flow compressor having an inlet, an outlet, a tubular stator structure extending between said inlet and said outlet, a plurality of rows of stator blades mounted in said stator structure, a rotor drum mounted within said stator structure, a plurality of rows of rotor blades carried by said rotor drum and extending between said rows of stator blades, delivery ducting connected to said outlet of said compressor and comprising an outer annular wall connected to said stator structure and an inner annular wall within said outer annular wall, a turbine rotor, a shaft rigidly connecting said turbine rotor and said rotor drum, a plurality of axially-spaced bearings bearing said shaft including a forward bearing for the end of said shaft nearest said inlet and a further bearing adjacent said turbine rotor, a stationary bearing support structure supporting said forward bearing and said further bearing, and support members connected to said outer annular wall, extending across said delivery ducting and connected to said stationary bearing support structure to constitute the sole support of said bearing support structure.

11. A gas turbine engine comprising a multi-stage axial-flow compressor having an inlet, an outlet, a tubular stator structure extending between said inlet and said outlet, a plurality of rows of stator blades mounted in said stator structure, a rotor drum mounted within said stator structure, a plurality of rows of rotor blades carried by said rotor drum and extending between said rows of stator blades, delivery ducting connected to said outlet of said compressor and comprising an outer annular wall connected to said stator structure and an inner annular wall within said outer annular wall, a compressor shaft supporting said rotor drum, a plurality of axially-spaced bearings bearing said compressor shaft including a forward bearing for the end of said compressor shaft nearest said inlet, a stationary bearing support structure supporting said forward bearing and support members connected to said outer annular wall, extending across said delivery ducting and connected to said stationary bearing support structure to constitute the sole support of said bearing support structure, a turbine rotor, a turbine shaft supporting said turbine rotor and coaxial with said compressor shaft, a bearing for said turbine shaft adjacent said turbine rotor, a second bearing support structure supporting said bearing adjacent said turbine rotor which second bearing support structure is separate from the first mentioned bearing support structure, and a drive coupling interconnecting said turbine shaft and said compressor shaft of the kind which permits slight malalignment between the shafts which it interconnects.

12. A gas turbine engine comprising a multi-stage axial-flow low-pressure compressor having an inlet, an outlet, a tubular stator structure extending between said inlet and said outlet, a plurality of rows of stator blades supported by said stator structure, a low-pressure rotor drum within said stator structure, a plurality of rows of rotor blades supported by said low-pressure rotor drum and alternating with said stator blades, a low-pressure compressor shaft supporting said low-pressure rotor drum, delivery ducting comprising an outer annular wall connected to said stator structure and an inner annular wall, which delivery ducting is connected to said outlet to receive the delivery from said low-pressure compressor, a high-pressure compressor having a high-pressure rotor rotatable independently of and coaxially with said low-pressure rotor drum, said high-pressure compressor being connected to said delivery ducting to take delivery from said low-pressure compressor through said delivery ducting, a high-pressure compressor shaft supporting said high-pressure rotor, said high-pressure compressor shaft being rotatable independently of and coaxially with said low-pressure compressor shaft, a bearing for said high-compressor shaft, a plurality of axially-spaced bearings for said low-pressure compressor shaft including a forward bearing nearest the inlet of said low-pressure compressor, a stationary bearing support structure supporting said forward bearing, and support members connected to said outer annular wall, extending across said delivery ducting and connected to said stationary bearing support structure to constitute the sole support for said stationary bearing support structure.

13. A gas turbine engine as claimed in claim 12 wherein the stationary bearing support structure transmits, at least in part, the loads from said bearing for the compressor shaft of the high-pressure compressor.

14. A gas turbine engine as claimed in claim 12, wherein said low-pressure rotor drum is a drum-like structure open at the outlet end of the compressor, wherein said forward bearing is located between said inlet and said outlet and wherein said stationary bearing support member extends from the open end of said drum-like structure into the interior thereof.

15. A gas turbine engine comprising a multi-stage axial-flow low-pressure compressor having an inlet, an outlet, a tubular stator structure extending between said inlet and said outlet, a plurality of rows of stator blades supported by said stator structure, a low-pressure rotor drum within said stator structure, a plurality of rows of rotor blades supported by said low-pressure rotor drum and alternating with said stator blades, a low-pressure compressor shaft supporting said low-pressure rotor drum, delivery ducting comprising an outer annular wall connected to said stator structure and an inner annular wall, which delivery ducting is connected to said outlet to receive the delivery from said low-pressure compressor, a high-pressure compressor having a high-pressure rotor rotatable independently of and coaxially with said low-pressure rotor drum, said high-pressure compressor being connected to said delivery ducting to take delivery from said low-pressure compressor through said delivery ducting, a hollow high-pressure compressor shaft supporting said high-pressure rotor, said hollow high-pressure compressor shaft being rotatable independently of and coaxially with said low-pressure compressor shaft, a plurality of axially-spaced bearings for said low-pressure compressor shaft including a forward bearing nearest the inlet of said low-pressure compressor and a second bearing for the end of said low-pressure compressor shaft remote from said inlet, which second bearing is mounted within said hollow high-pressure compressor shaft and is supported thereby, a third bearing for said hollow high-pressure compressor shaft adjacent said second bearing, a stationary bearing support structure supporting said forward bearing and said third bearing, and support members connected to said outer annular wall, extending across said delivery ducting and connected to said stationary bearing support structure to constitute the sole support for said stationary bearing support structure.

16. A gas turbine engine comprising a multi-stage axial-flow low-pressure compressor having an inlet, an outlet, a tubular low-pressure stator structure extending between said inlet and said outlet, a plurality of rows of low-pressure stator blades supported by said low-pressure stator structure, a low-pressure rotor drum within said stator structure, a plurality of rows of low-pressure rotor blades supported by said low-pressure rotor drum and alternating with said low-pressure stator blades, a low-pressure compressor shaft supporting said low-pressure rotor drum, delivery ducting comprising an outer annular wall connected to said stator structure and an inner annular wall, which delivery ducting is connected to said outlet to receive the delivery from said low-pressure compressor, a multi-stage axial-flow high-pressure compressor having a tubular high-pressure stator structure, a plurality of stages of high-pressure stator blades supported by said high-pressure stator structure, a high-pressure rotor drum rotatable independently of and coaxially with said low-pressure rotor drum, a plurality of rows of high-pressure rotor blades supported by said high-pressure rotor drum and alternating with said high-pressure stator blades, said high-pressure compressor being connected to take delivery from said low-pressure compressor through said delivery ducting, a plurality of axially-spaced bearings for said low-pressure compressor shaft including a forward bearing nearest the inlet of said low-pressure compressor and located within said low-pressure rotor drum, and a second bearing located within said high-pressure rotor drum, a stationary bearing support structure for said forward bearing having a first part extending within said low pressure rotor drum and supporting said forward bearing and a second part extending within said high-pressure rotor drum and supporting said second bearing, and support members connected to said outer annular wall, extending across said delivery ducting and connected to said stationary bearing support structure to constitute the sole support for said stationary bearing support structure.

17. A gas turbine engine as claimed in claim 16 further comprising a hollow high-pressure compressor shaft supporting said high-pressure rotor drum and a third bearing for said hollow high-pressure compressor shaft located within said high-pressure rotor drum and wherein said second bearing is received within and carried by said hollow high-pressure compressor shaft adjacent said third bearing, whereby part at least of the bearing loads from said second bearing are transmitted through said third bearing, and wherein said third bearing is carried by said second part of said stationary bearing support structure.

18. A gas turbine engine comprising a multi-stage axial-flow low-pressure compressor having an inlet, an outlet, a tubular stator structure extending between said inlet and said outlet, a plurality of rows of stator blades supported by said stator structure, a low-pressure rotor drum within said stator structure, a plurality of rows of rotor blades supported by said low-pressure rotor drum and alternating with said stator blades, a low-pressure compressor shaft supporting said low-pressure rotor drum, delivery ducting comprising an outer annular wall connected to said stator structure and an inner annular wall, which delivery ducting is connected to said outlet to receive the delivery from said low-pressure compressor, a high-pressure compressor having a high-pressure rotor rotatable independently of and coaxially with said low-pressure rotor drum, said high-pressure compressor being connected to take delivery from said low-pressure compressor through said delivery ducting, a high-pressure compressor shaft supporting said high-pressure rotor, said high-pressure compressor shaft being rotatable independently of and coaxially with said low-pressure compressor shaft, a bearing for said high-pressure compressor shaft, a plurality of axially-spaced bearings for said low-pressure compressor shaft including a forward bearing nearest the inlet of said low-pressure compressor, a stationary bearing support structure supporting said forward bearing and defining an annular space between itself and said low-pressure compressor shaft, support members connected to said outer annular wall extending across said delivery ducting and connected to said stationary bearing support structure to constitute the sole support for said stationary bearing support structure, auxiliary drive mechanism located in said annular space, and a drive connection between one of said compressor shafts and said auxiliary drive mechanism.

19. A gas turbine engine as claimed in claim 18 wherein the auxiliary drive mechanism is driven by the high-pressure compressor shaft.

20. A gas turbine engine as claimed in claim 18 wherein said auxiliary drive mechanism includes a reduction gear and a drive shaft extending across said delivery ducting.

21. A gas turbine engine comprising a multi-stage axial-flow low-pressure compressor having an inlet, an outlet, a tubular low-pressure stator structure extending between said inlet and said outlet, a plurality of rows of low-pressure stator blades supported by said stator structure, a low-pressure rotor drum within said stator structure, a plurality of rows of rotor blades supported by said low-pressure rotor drum and alternating with said stator blades, a low-pressure compressor shaft supporting said low-pressure rotor drum, delivery ducting comprising an outer annular wall connected to said low-pressure stator structure and an inner annular wall, which delivery ducting is connected to said outlet to receive the delivery from said low-pressure compressor, a high-pressure compressor having a high-pressure stator structure connected to said outer annular wall and a high-pressure rotor within said high-pressure stator structure rotatable independently of and coaxially with said low-pressure rotor drum, said high-pressure compressor being connected to take delivery from said low-pressure compressor through said delivery ducting, a hollow high-pressure compressor shaft supporting said high-pressure rotor, said hollow high-pressure compressor shaft being rotatable independently of and coaxially with said low-pressure compressor shaft, a bearing for said high-pressure compressor shaft, a pair of axially-spaced bearings for said low-pressure compressor shaft including a forward bearing nearest the inlet of said low-pressure compressor and a second bearing mounted in said hollow high-pressure compressor shaft, a stationary bearing support structure supporting said forward bearing and said bearing for said high-pressure compressor shaft, support members connected to said outer annular wall, extending across said delivery ducting and connected to said stationary bearing support structure to constitute the sole support for said stationary bearing support structure, combustion equipment connected to take delivery from said high-pressure compressor, a high-pressure turbine, duct means connected between said high-pressure turbine and said combustion equipment to convey hot products of combustion from said combustion equipment to said high-pressure turbine and including a second outer annular wall and a second inner annular wall, a high-pressure turbine rotor in said high-pressure turbine, a hollow high-pressure turbine shaft supporting said high-pressure turbine rotor and coaxial with said high-pressure compressor shaft, a bearing for said high-pressure turbine shaft adjacent said high-pressure turbine rotor, further stationary bearing support structure supporting said bearing for said high-pressure turbine shaft, further support members connected to said further outer annular wall, extending across said duct means and connected to said further stationary bearing support structure, a drive connection between said high-pressure turbine shaft and said high-pressure compressor shaft, a low-pressure turbine connected to receive exhaust from said high-pressure turbine, a low-pressure turbine rotor in said low-pressure turbine, a low-pressure turbine shaft supporting said low-pressure turbine rotor and coaxial with said low-pressure compressor shaft, a bearing for said low-pressure turbine shaft received within and supported by said hollow high-pressure turbine shaft and located adjacent said bearing for said hollow high-pressure turbine shaft, and a drive connection interconnecting said low-pressure turbine shaft and said low-pressure compressor shaft, which drive connection is of the kind permitting slight misalignment between the shafts which it interconnects.

22. A gas turbine engine comprising a multi-stage axial-flow compressor having an inlet, an outlet, a tubular stator structure extending between said inlet and said outlet, a plurality of rows of stator blades mounted in said stator structure, a rotor drum mounted within said stator structure, a plurality of rows of rotor blades carried by said rotor drum and extending between said rows of stator blades, delivery ducting connected to said outlet of said compressor and comprising an outer annular wall connected to said stator structure and an inner annular wall within said outer annular wall, a compressor shaft supporting said rotor drum, a plurality of axially-spaced bearings bearing said compressor shaft including a forward bearing for the end of said compressor shaft nearest said inlet, a stationary bearing support structure supporting said forward bearing, support members connected to said outer annular wall, extending across said delivery ducting and connected to said stationary bearing support structure to constitute the sole support for said stationary bearing support structure, a compressor rotor disc, a row of further rotor blades carried by said rotor disc and located between said inlet and said rows of rotor blades carried by said rotor drum, an inlet row of stator blades mounted in said stator structure and located between said row of further rotor blades and said inlet, a further shaft supporting said rotor disc, a bearing for said further shaft supported by said inlet row of stator blades and a drive connection between said rotor disc and said compressor shaft.

References Cited in the file of this patent
UNITED STATES PATENTS

| | | |
|---|---|---|
| 2,528,635 | Bell et al. | Nov. 7, 1950 |
| 2,540,991 | Price | Feb. 6, 1951 |
| 2,546,420 | Barr | Mar. 27, 1951 |
| 2,589,078 | Hawthorne | Mar. 11, 1952 |
| 2,608,056 | Secord et al. | Aug. 26, 1952 |
| 2,625,790 | Petrie | Jan. 20, 1953 |

FOREIGN PATENTS

| | | |
|---|---|---|
| 943,189 | France | Oct. 4, 1948 |